(12) United States Patent
Tsuboi

(10) Patent No.: US 9,002,482 B2
(45) Date of Patent: Apr. 7, 2015

(54) CLEANING ROBOT

(75) Inventor: Masanori Tsuboi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/239,576

(22) PCT Filed: Sep. 3, 2012

(86) PCT No.: PCT/JP2012/072300
§ 371 (c)(1),
(2), (4) Date: Feb. 19, 2014

(87) PCT Pub. No.: WO2013/054608
PCT Pub. Date: Apr. 18, 2013

(65) Prior Publication Data
US 2014/0180525 A1    Jun. 26, 2014

(30) Foreign Application Priority Data
Oct. 14, 2011 (JP) .................. 2011-226931

(51) Int. Cl.
*A47L 9/28* (2006.01)
*G05D 1/00* (2006.01)
*A47L 7/04* (2006.01)
*G05D 1/02* (2006.01)

(52) U.S. Cl.
CPC .............. *A47L 9/28* (2013.01); *G05D 1/0033* (2013.01); *A47L 2201/06* (2013.01); *A47L 7/04* (2013.01); *G05D 1/0276* (2013.01); *A47L 9/2852* (2013.01); *G05D 1/0016* (2013.01); *G05D 2201/0215* (2013.01)

(58) Field of Classification Search
CPC ... A47L 9/2805; A47L 9/2842; A47L 9/2852; A47L 9/2857; A47L 9/2894; G05D 1/0276; G05D 1/0242; B25J 5/007; B25J 9/0003; B25J 11/0085

USPC .......... 700/245, 264; 318/568.12; 340/12.22, 340/13.25
See application file for complete search history.

(56) References Cited

U.S. PATENT DOCUMENTS

| | | | |
|---|---|---|---|
| 7,693,605 B2 * | 4/2010 | Park | 700/245 |
| 2005/0022331 A1 * | 2/2005 | Kim et al. | 15/319 |

(Continued)

FOREIGN PATENT DOCUMENTS

| | | | |
|---|---|---|---|
| JP | 2003-079552 A | 3/2003 | |
| JP | 2004-166968 A | 6/2004 | |
| JP | 2005-046616 A | 2/2005 | |

(Continued)

OTHER PUBLICATIONS

Official Communication issued in International Patent Application No. PCT/JP2012/072300, mailed on Dec. 4, 2012.

*Primary Examiner* — Thomas G Black
*Assistant Examiner* — Ana Thomas
(74) *Attorney, Agent, or Firm* — Keating & Bennett, LLP

(57) ABSTRACT

A cleaning robot (1) is provided with: a main body housing (2) that moves along a floor in a self-propelled manner with a suction port (6) and an exhaust port (7) open; a motor fan (22) positioned inside the main body housing (2); a dust collection part (30) driven by the motor fan (22) so as to collect airflow dust that has been suctioned from the suction port (6); an infrared remote controller (60) that specifies an arbitrarily-defined location in space for setting up the main body housing (2) by emitting infrared rays; and an infrared sensor (18) that detects the specified location specified by the infrared remote controller (60). The cleaning robot moves to the specified location detected by the infrared sensor (18) and then carries out a cleaning operation, or carries out a cleaning operation while moving to the specified location.

3 Claims, 6 Drawing Sheets

(56) References Cited

U.S. PATENT DOCUMENTS

2006/0069465 A1 3/2006 Saeki
2006/0074528 A1 4/2006 Uehigashi

FOREIGN PATENT DOCUMENTS

| JP | 2006-095005 A | 4/2006 |
| JP | 2006-095006 A | 4/2006 |
| JP | 4431446 B2 | 3/2010 |

* cited by examiner

CLEANING ROBOT

TECHNICAL FIELD

The present invention relates to a cleaning robot that travels in a self-propelled manner on a floor surface.

BACKGROUND ART

Patent Document 1 discloses a conventional cleaning robot. This cleaning robot has drive wheels provided at a main body housing thereof that is substantially circular in planar view, and performs cleaning while traveling in a self-propelled manner on a floor surface. In this case, the main body housing is designed to be of a thin type having a reduced height so as to allow cleaning under a table or the like. The main body housing is provided at a lower surface thereof with a sweep-up brush roller for collecting dust, and inside the main body housing, a dust storage portion is provided.

Furthermore, this conventional cleaning robot includes a designation device (remote controller) that is a separate body from the main body housing. The cleaning robot receives from the designation device a start signal for starting a self-propelled mode, a halt signal for halting the self-propelled mode, and the like and executes operations corresponding to those signals, respectively.

In the cleaning robot configured as above, upon a start of a cleaning operation, the drive wheels and the sweep-up brush roller are started to be driven. By rotation of the drive wheels, the main body housing travels in a self-propelled manner on a floor surface in a room, and dust is swept up by the sweep-up brush roller from the floor surface toward into the main body housing. The dust swept up from the floor surface is stored in the dust storage portion.

This conventional cleaning robot is capable of executing a cleaning operation while traveling in a self-propelled manner at a command from the designation device (remote controller). Furthermore, this cleaning robot is also capable of executing a cleaning operation by receiving, via the designation device, a manually inputted command to, for example, move forward, move rearward, or turn around.

LIST OF CITATIONS

Patent Literature

Patent Document 1: JP-A-2004-166968 (pages 9 to 12, FIG. 1)

SUMMARY OF THE INVENTION

Technical Problem

In order to make the above-described conventional cleaning robot move to a user's desired location, however, it is required that every command to, for example, move forward, move rearward, or turn around be manually transmitted one by one by using the designation device. This has led to a problem that it requires considerable effort to guide the cleaning robot to a user's desired location, resulting in a lot of time being taken to perform cleaning, and this might cause a feeling of discomfort to the user. Furthermore, there has also been a problem that power is consumed more than necessary.

The present invention has been made in view of the above-described issues and has as its object to provide a cleaning robot that can be easily guided to a user's desired arbitrary location and thus is capable of implementing a cleaning operation with further improved efficiency.

Solution to the Problem

In order to solve the above-described problems, a cleaning robot according to the present invention includes a main body housing that has a suction port and an air exhaust port formed therethrough and travels in a self-propelled manner on a floor surface, a motor-driven blower that is arranged in the main body housing, a dust collection portion for collecting therein dust in airflow sucked in through the suction port by driving of the motor-driven blower, a designation device that designates, by emitting an electromagnetic wave or a sound wave, an arbitrary location in an space in which the main body housing is installed, and a detection device that detects the location thus designated by the designation device. The cleaning robot moves to the designated location detected by the detection device, where it executes a cleaning operation, and/or executes a cleaning operation when moving to the designated location.

According to this configuration, the main body housing of the cleaning robot travels in a self-propelled manner on a floor surface, and when the motor-driven blower is started to be driven, airflow containing dust is sucked in through the suction port formed through the main body housing. The dust contained in the airflow is collected in the dust collection portion. The airflow from which the dust has been removed in the dust collection portion passes through the motor-driven blower to be exhausted through the air exhaust port formed through the main body housing. Upon a user designating a desired location by using the designation device, the detection device in the cleaning robot detects the location thus designated, and the cleaning robot automatically moves to the designated location, where it executes a cleaning operation, and/or executes a cleaning operation when moving to the designated location. An "electromagnetic wave" as noted herein encompasses a radio wave, infrared radiation, a visible light ray, and ultraviolet radiation.

Furthermore, in the cleaning robot configured as above, a length of time in which the cleaning robot stays at the designated location is made to vary according to a length of designation time in which designation using the electromagnetic wave or the sound wave is performed.

According to this configuration, the cleaning robot executes a cleaning operation at a designated location for a length of time varying according to a length of designation time in which designation using an electromagnetic wave or a sound wave is performed.

Furthermore, in cleaning robot configured as above, the electromagnetic wave emitted by the designation device is infrared radiation, and as the detection device, an infrared sensor that detects infrared radiation is used.

According to this configuration, a user designates, by using infrared radiation, an arbitrary location in a space in which the main body housing is installed. The location thus designated is detected by the infrared sensor in the cleaning robot.

Furthermore, the cleaning robot configured as above further includes an ion generation device that releases ions into airflow flowing through the air exhaust port.

According to this configuration, airflow containing ions is delivered to inside a room through the air exhaust port formed through the main body housing. With this configuration, the cleaning robot moves to a designated location designated by a user by using the designation device, where it executes a cleaning operation, and delivers ions to inside a room at the designated location.

Advantageous Effects of the Invention

According to the configuration of the present invention, the cleaning robot automatically moves to a designated location designated by a user by using the designation device, where it executes a cleaning operation. With this configuration, the cleaning robot can be easily guided to a user's desired arbitrary location, and thus cleaning at a user's designated location can be executed with promptness and reduced power consumption. Thus, there can be provided a cleaning robot that is capable of implementing a cleaning operation with further improved efficiency.

DESCRIPTION OF EMBODIMENTS

The following describes a cleaning robot according to an embodiment of the present invention with reference to FIGS. 1 to 6.

Figure 1:
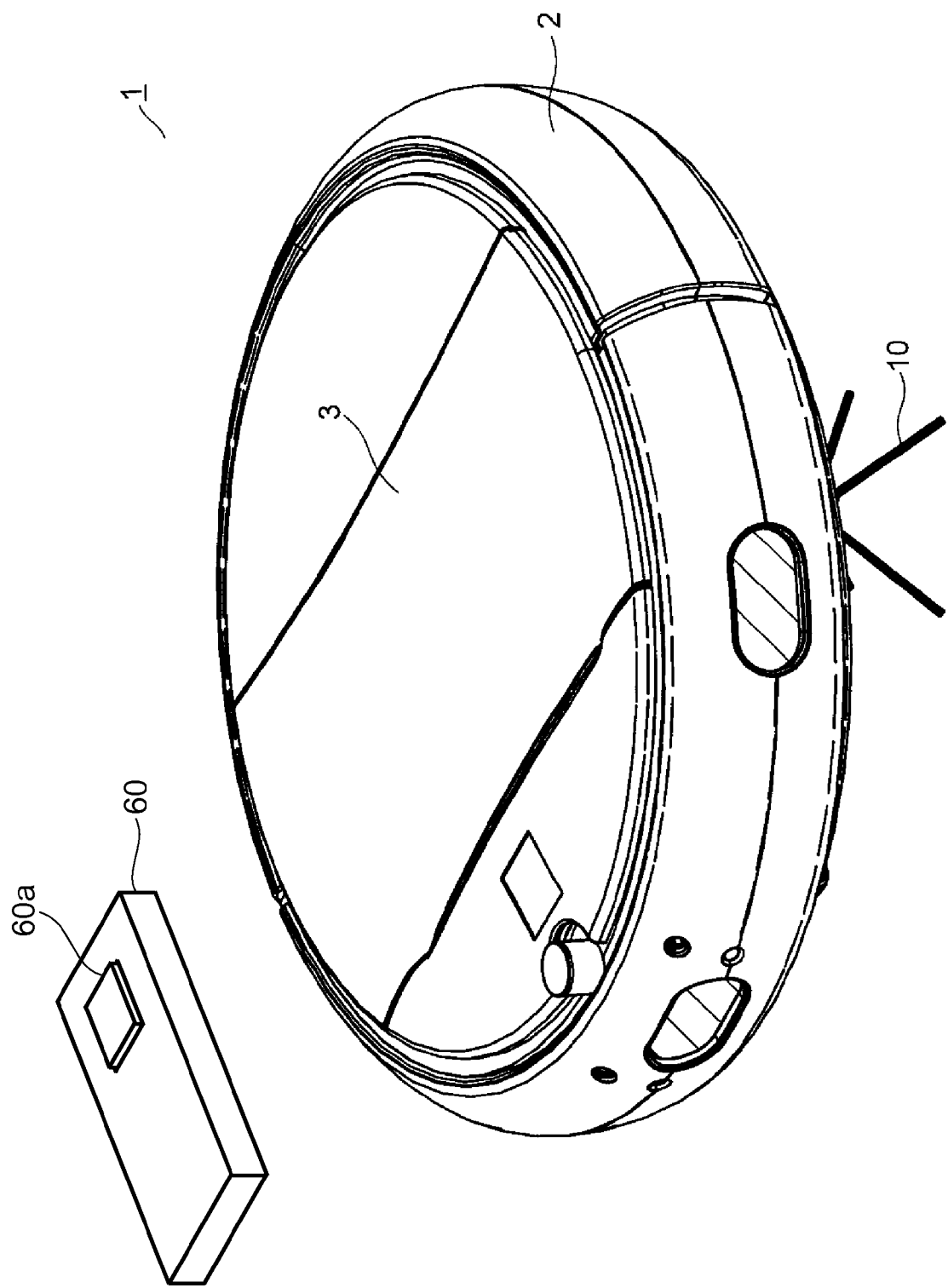
FIG. 1 is a perspective view of a cleaning robot according to an embodiment of the present invention.
Figure 2:
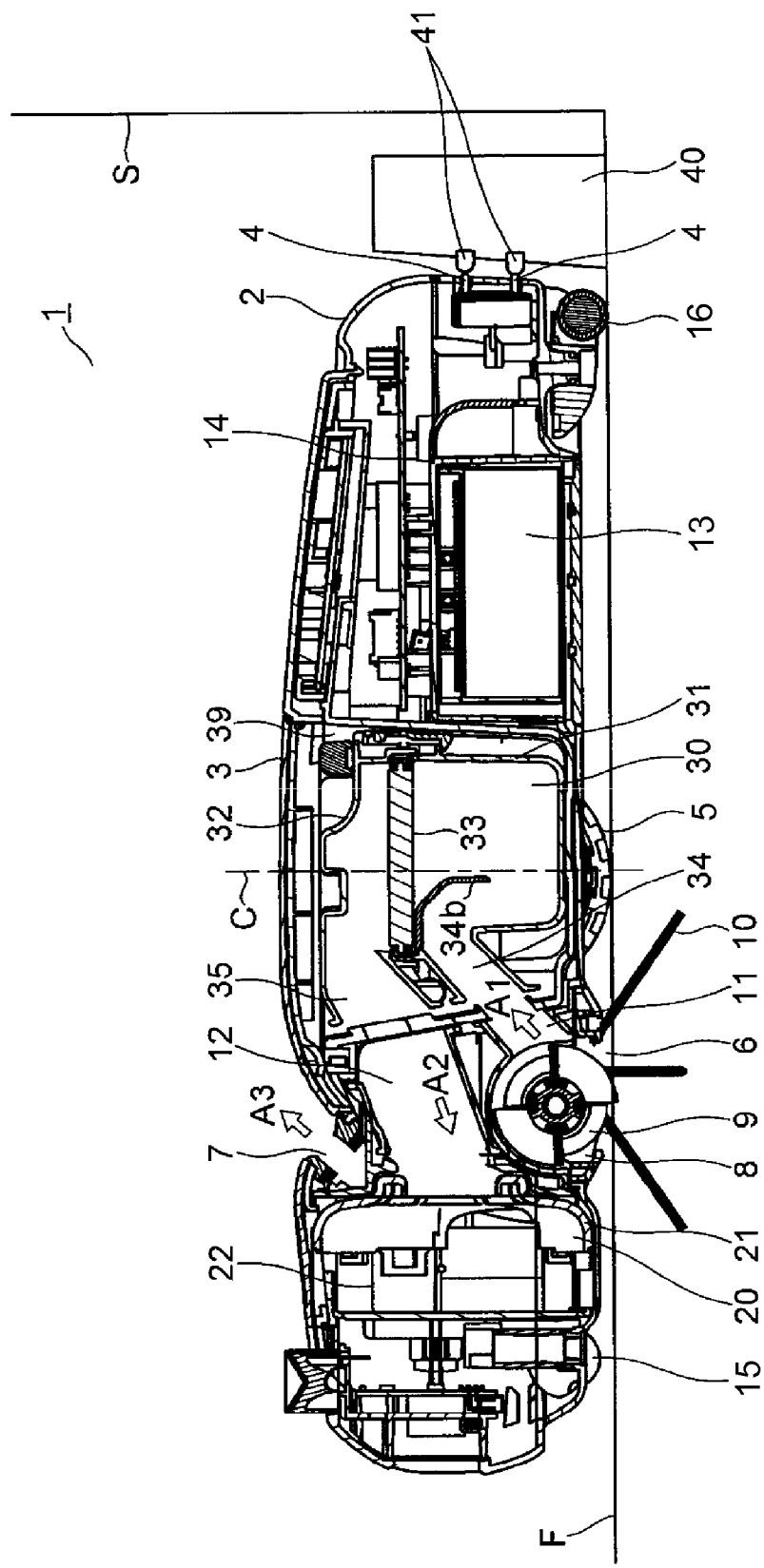
FIG. 2 is a vertical sectional side view of a main body housing of the cleaning robot shown in FIG. 1.
Figure 3:
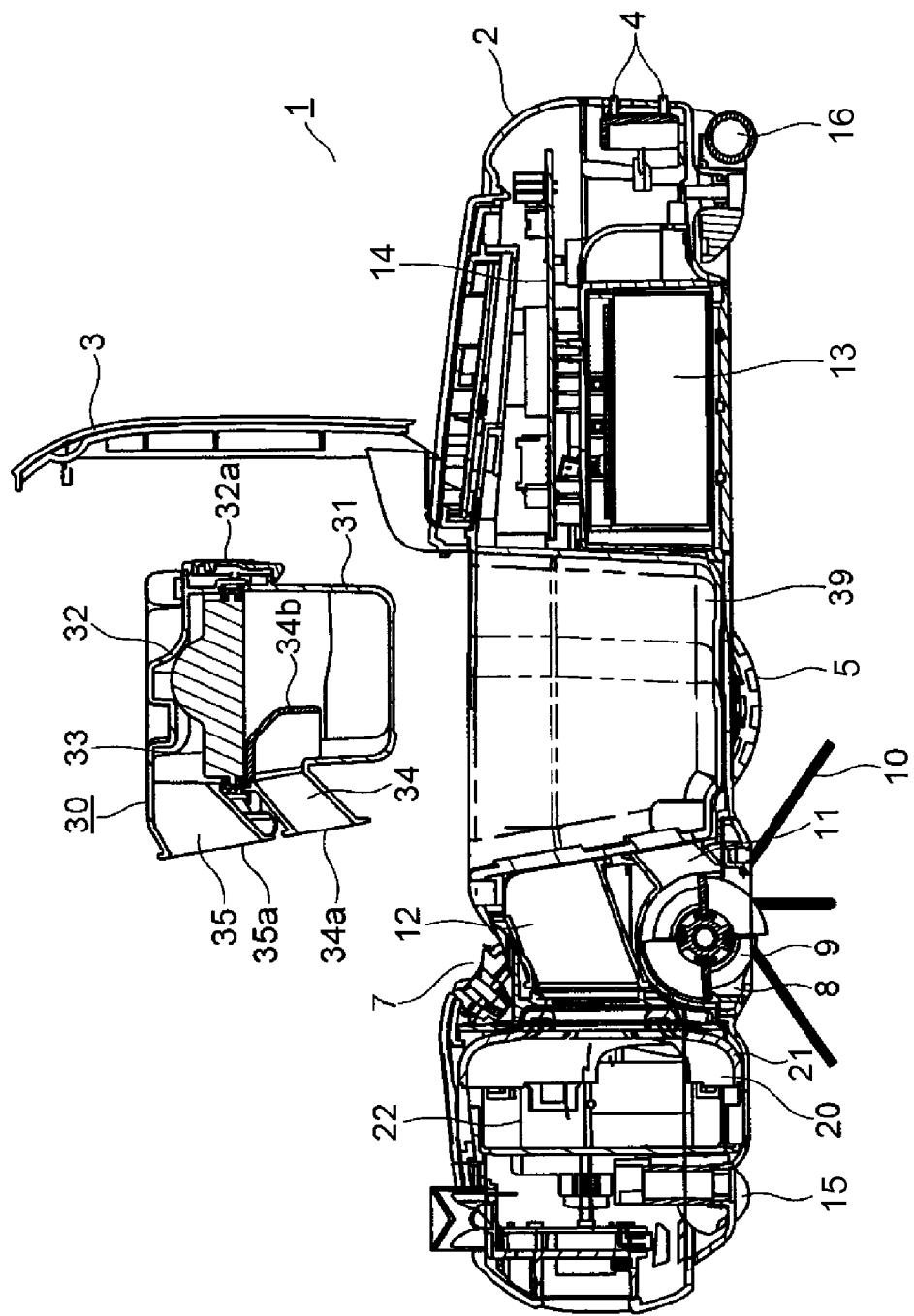
FIG. 3 is a vertical sectional side view showing the cleaning robot in FIG. 2 in a state where a dust collection portion is removed therefrom.
Figure 4:
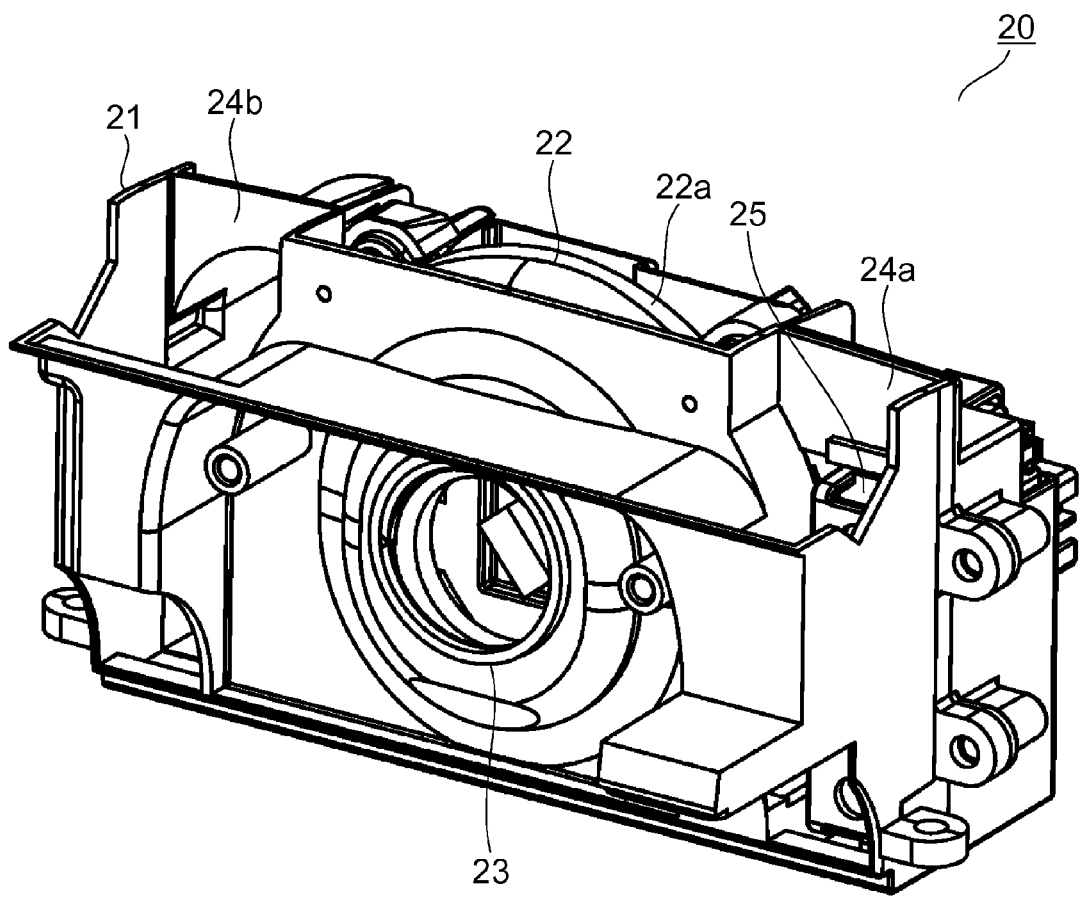
FIG. 4 is a perspective view of a motor unit of the cleaning robot shown in FIG. 2.
Figure 5:
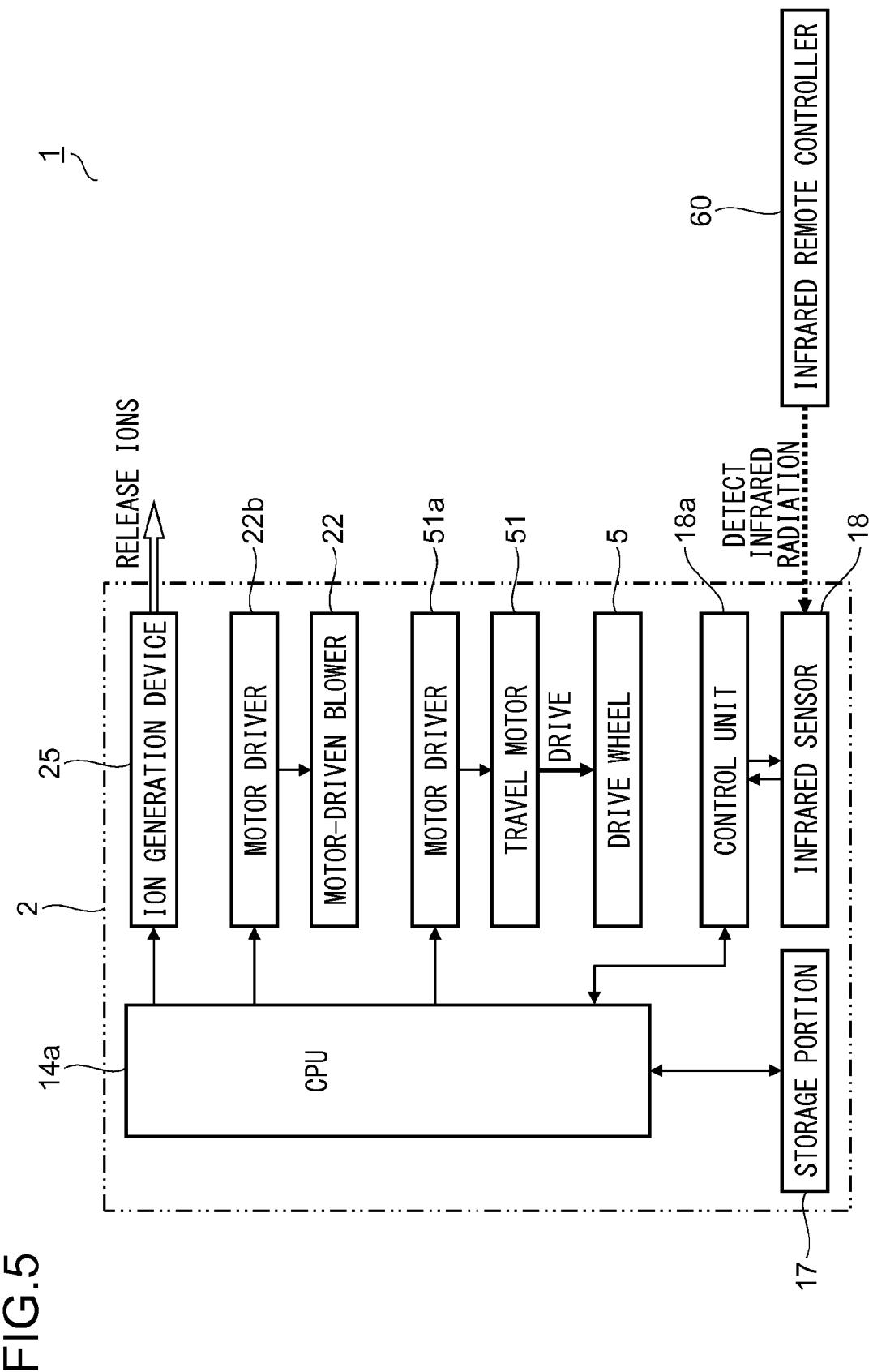
FIG. 5 is a block diagram showing a configuration of the cleaning robot in FIG. 1.

First, as to the cleaning robot according to the embodiment of the present invention, a structure thereof is briefly described with reference to FIGS. 1 to 5, and a dust collection operation is described along therewith. FIG. 1 is a perspective view of the cleaning robot, FIG. 2 is a vertical sectional side view of a main body housing of the cleaning robot, and FIG. 3 is a vertical sectional side view showing the cleaning robot in a state where a dust collection portion is removed therefrom. Further, FIG. 4 is a perspective view of a motor unit of the cleaning robot, and FIG. 5 is a block diagram showing a configuration of the cleaning robot.

As shown in FIG. 1, a cleaning robot 1 has a main body housing 2 that is circular in planar view and travels in a self-propelled manner by driving drive wheels 5 on a battery 13 (for both of these, see FIG. 2). The main body housing 2 is provided at an upper surface thereof with a lid portion 3 that is opened/closed for mounting/demounting a dust collection portion 30 (see FIG. 2).

As shown in FIG. 2, in the main body housing 2, there are arranged a pair of drive wheels 5 that protrude from a bottom surface of the main body housing 2. A rotation axis of the drive wheels 5 is arranged on a center line C of the main body housing 2. When both the drive wheels 5 rotate in one direction, the main body housing 2 moves forward or rearward, and when the drive wheels 5 rotate in a direction opposite to each other, the main body housing 2 rotates in place about the center line C, i.e. turns around. The drive wheels 5 are driven by a travel motor 51 (see FIG. 5).

The main body housing 2 has, in a front part thereof that is to be directed forward in a travel direction when cleaning is performed, a suction port 6 provided at a lower surface thereof. The suction port 6 is constituted by an open surface of a concave portion 8 provided to be concave at the bottom surface of the main body housing 2 and formed to face a floor surface F. In the concave portion 8, there is arranged a rotary brush 9 that rotates about a horizontal rotation axis thereof, and on both lateral sides of the concave portion 8, a side brush 10 that rotates about a vertical rotation axis thereof is arranged.

Forward of the concave portion 8, a roller-shaped front wheel 15 is provided. At a rear end of the main body housing 2, a rear wheel 16 that is a free wheel is provided. Normally, the front wheel 15 is separated from the floor surface F, and cleaning is performed with the rotary brush 9, the drive wheels 5, and the rear wheel 16 being in contact with the floor surface F. The front wheel 15 is configured to come in contact with a bump that may appear on a travel route so as to make it easy for the main body housing 2 to pass over the bump.

At a rear end of the main body housing 2 on a peripheral surface thereof, charge terminals 4 for charging the battery 13 is provided. The main body housing 2 travels in a self-propelled manner to return to a charge stand 40 installed in a room, and thus the charge terminals 4 come in contact with terminal portions 41 provided at the charge stand 40, causing the battery 13 to be charged. The charge stand 40 that is connected to a commercial power source is normally installed along a side wall S in a room.

In the main body housing 2, the dust collection portion 30 for collecting dust therein is arranged. The dust collection portion 30 is housed in a dust collection chamber 39 provided in the main body housing 2. The dust collection chamber 39 is formed as an isolated chamber whose surrounding peripheral surfaces and bottom surface are covered, and wall surfaces thereof except at a front wall, therefore, are closed. At the front wall of the dust collection chamber 39, a first air suction path 11 communicating with the concave portion 8 and a second air suction path 12 arranged above the concave portion 8 and communicating with an after-mentioned motor unit 20 are led out.

The dust collection portion 30 is arranged on the center line C of the main body housing 2, and opening the lid portion 3 of the main body housing 2 as shown in FIG. 3 enables mounting/demounting of the dust collection portion 30. The dust collection portion 30 is formed by mounting an upper cover 32 having a filter 33 to an upper surface of a dust collection container 31 of a bottomed cylindrical shape. The upper cover 32 is latched to the dust collection container 31 by using a movable latch portion 32a and can be removed from the dust collection container 31 by operating the latch portion 32a. Thus, dust accumulated in the dust collection container 31 can be discarded.

At a peripheral surface of the dust collection container 31, a flow-in path 34 having a flow-in port 34a formed at a tip end thereof and communicating with the first air suction path 11 is led out. In the dust collection container 31, a flow-in portion 34b that is continuous with the flow-in path 34 and bent to guide airflow downward is provided. At a peripheral surface of the upper cover 32, a flow-out path 35 having a flow-out port 35a formed at a tip end thereof and communicating with the second air suction path 12 is led out.

Around each of the flow-in port 34a and the flow-out port 35a, packing (not shown) that comes in intimate contact with the front wall of the dust collection chamber 39 is provided. Thus, the inside of the dust collection chamber 39 housing the dust collection portion 30 therein is hermetically sealed. The front wall of the dust collection chamber 39 is formed to be an inclined surface so that the packing can be prevented from deteriorating due to sliding thereof against the front wall when the dust collection portion 30 is mounted/demounted.

In the main body housing 2, in an upper part rearward of the dust collection chamber 39, a control board 14 having an after-mentioned CPU 14a (see FIG. 5) is arranged. On the control board 14, a control circuit including the CPU 14a that controls various portions of the cleaning robot 1 is provided. In a lower part rearward of the dust collection chamber 39, the battery 13 that is demountable is arranged. The battery 13 is charged from the charge stand 40 via the charge terminals 4 and supplies power to the control board 14 and to respective motor portions of the drive wheels 5, the rotary brush 9, the side brush 10, a motor-driven blower 22, and the like.

In the front part of the main body housing 2, the motor unit 20 is arranged. As shown in FIG. 4, the motor unit 20 includes a housing 21 that is a resin molded article and the motor-driven blower 22 housed in the housing 21. The motor-driven blower 22 is formed of a turbofan covered with a motor case 22a.

The motor case 22a of the motor-driven blower 22 has an air suction port (not shown) formed at one end thereof in an axial direction and an air exhaust port (not shown) formed at each of two locations on a peripheral surface thereof. At a front surface of the housing 21, an opening portion 23 facing the air suction port of the motor case 22a and communicating with the second air suction path 12 is provided. In the housing 21, on both lateral sides of the motor-driven blower 22, a first air exhaust path 24a and a second air exhaust path 24b communicating with the air exhaust ports of the motor case 22a, respectively, are provided. The first and second air exhaust paths 24a and 24b communicate with an air exhaust port 7 (see FIG. 2 and FIG. 3) provided at the upper surface of the main body housing 2. The air exhaust port 7 extends in a lateral direction perpendicular to a front-rear direction of the main body housing 2.

In the first air exhaust path 24a, an ion generation device 25 having a pair of electrodes (not shown) is arranged. A voltage having an alternating current waveform or an impulse waveform is applied to each of the electrodes of the ion generation device 25, and ions generated by resulting corona discharge of the electrodes are released into the first air exhaust path 24a, namely, an air exhaust flow path between the motor-driven blower 22 and the air exhaust port 7.

A positive voltage is applied to one of the electrodes, and hydrogen ions generated by resulting corona discharge combine with water in the air to generate plus ions mainly formed of $H^+(H_2O)m$. A negative voltage is applied to the other of the electrodes, and oxygen ions generated by resulting corona discharge combine with water in the air to generate minus ions mainly formed of $O_2^-(H_2O)n$. Herein, m and n are arbitrary natural numbers. $H^+(H_2O)m$ and $O_2^-(H_2O)n$ aggregate on surfaces of floating bacteria and odor components in the air and surround the bacteria and odor components.

Then, as expressed by Equations (1) to (3), $H^+(H_2O)m$ and $O_2^-(H_2O)n$ aggregate-form, by collision, [—OH] (hydroxyl radical) and $H_2O_2$ (hydrogen peroxide), which are active species, on surfaces of microorganisms and the like, thus destroying floating bacteria and odor components. Herein, m' and n' are arbitrary natural numbers. Based on this, bacteria eradication and deodorization in a room can be performed by generating plus ions and minus ions and delivering them to inside the room through the air exhaust port 7.

$$H^+(H_2O)m + O_2^-(H_2O)n \rightarrow \cdot OH + 1/2 O_2 + (m+n)H_2O \quad (1)$$

$$H^+(H_2O)m + H^+(H_2O)m' + O_2^-(H_2O)n + O_2^-(H_2O)n' \rightarrow 2 \cdot OH + O_2 + (m+m'+n+n')H_2O \quad (2)$$

$$H^+(H_2O)m + H^+(H_2O)m' + O_2^-(H_2O)n + O_2^-(H_2O)n' \rightarrow H_2O_2 + O_2 + (m+m'+n+n')H_2O \quad (3)$$

Herein, in order to control operations of the cleaning robot 1 as a whole, the control board 14 is composed of the CPU 14a shown in FIG. 5 and other unshown electronic components. The CPU 14a is a central processing unit and controls, based on programs and data stored or inputted in a storage portion 17 or the like, the constituent components such as the motor-driven blower 22, the ion generation device 25, and the travel motor 51 to achieve a sequence of cleaning and ion delivery operations. Furthermore, the CPU 14a accepts user's condition settings related to the operations of the cleaning robot 1 from an operation panel (not shown) and has them stored in the storage portion 17 or the like.

The cleaning robot 1 includes a motor driver 22b for driving the motor-driven blower 22 and a motor driver 51a for driving the travel motor 51. The CPU 14a transmits a control signal to each of the motor driver 22b and the motor driver 51a so as to drive the motor-driven blower 22 and the travel motor 51.

Furthermore, the cleaning robot 1 includes an infrared sensor 18 for detecting infrared radiation with which irradiation is being performed in the vicinity of the main body housing 2. The infrared sensor 18 is, for example, a quantum-type infrared sensor having 256 vertical pixels by 256 horizontal pixels and is, in the form of, for example, being incorporated in a camera having a lens or the like, arranged in the neighborhood of an apparatus exterior in order to detect infrared radiation outside the main body housing 2. The CPU 14a is connected to the infrared sensor 18 via a control unit 18a and obtains, based on an output obtained from the infrared sensor 18, information regarding infrared radiation with which irradiation is being performed in the vicinity of the outside of the main body housing 2.

Furthermore, as shown in FIG. 1 and FIG. 5, the cleaning robot 1 includes an infrared remote controller 60 separate from the main body housing 2. When an irradiation button 60a is pressed down by a user, the infrared remote controller 60 emits infrared radiation from an unshown irradiation portion thereof toward the outside. The infrared remote controller 60 is a designation device that designates, by emitting infrared radiation, an arbitrary location in a space in which the main body housing 2 is installed. Further, the infrared sensor 18 provided in the main body housing 2 is a detection device that detects a designated location designated by the infrared remote controller 60. When a designated cleaning location in a space in which the main body housing 2 is installed is designated by using the infrared remote controller 60, the cleaning robot 1 moves in a self-propelled manner to the designated location detected by the infrared sensor 18, where it executes a cleaning operation. Also, the cleaning robot 1 executes a cleaning operation while traveling in a self-propelled manner when moving to the designated location.

In the cleaning robot 1 configured as above, when a command to perform a cleaning operation is issued, the motor-driven blower 22, the ion generation device 25, the drive wheels 5, the rotary brush 9, and the side brush 10 are started to be driven. This causes the main body housing 2 to travel in a self-propelled manner in a predetermined area with the rotary brush 9, the drive wheels 5, and the rear wheel 16 being in contact with the floor surface F and sucks in airflow containing dust on the floor surface F through the suction port 6.

At this time, by rotation of the rotary brush 9, dust on the floor surface F is swept up and guided into the concave portion 8. Furthermore, by rotation of the side brush 10, dust on lateral sides of the suction port 6 is guided into the suction port 6.

As shown by an arrow A1, the airflow sucked in through the suction port 6 flows rearward through the first air suction path 11 into the dust collection portion 30 via the flow-in port 34a. The airflow that has flowed into the dust collection portion 30, after the dust therein is captured by the filter 33, flows out from the dust collection portion 30 via the flow-out port 35a. Thus, dust is collected and accumulated in the dust collection container 31. As shown by an arrow A2, the airflow that has flowed out from the dust collection portion 30 flows forward through the second air suction path 12 into the motor-driven blower 22 of the motor unit 20 via the opening portion 23.

The airflow that has passed through the motor-driven blower 22 flows through the first air exhaust path 24a and the second air exhaust path 24b. Airflow flowing through the first air exhaust path 24a contains ions released by the ion generation device 25. Then, through the air exhaust port 7 provided at the upper surface of the main body housing 2, as shown by an arrow A3, the airflow containing the ions is exhausted in an oblique direction toward upwardly rearward. Thus, cleaning in a room is performed, and ions contained in exhaust air from the main body housing 2 traveling in a self-propelled manner are spread out in the room to perform bacteria eradication and deodorization in the room. At this time, through the air exhaust port 7, the air is exhausted toward upward, and thus dust on the floor surface F is prevented from flying up, so that cleanliness in the room can be improved.

The cleaning robot 1 is not only capable of simultaneously executing a cleaning operation and an ion delivery operation as described above but also capable of executing a cleaning operation and an ion delivery operation independently of each other.

Furthermore, when both the drive wheels 5 are made to rotate in a direction opposite to each other, the main body housing 2 rotates about the center line C, changing its orientation, to turn around. Thus, the main body housing 2 can be made to travel in a self-propelled manner throughout a desired area and can be made to travel while avoiding obstacles. The main body housing 2 may be made to move rearward by making both the drive wheels 5 rotate in a direction reverse to a case where the main body housing 2 moves forward.

Upon completion of cleaning, the main body housing 2 travels in a self-propelled manner to return to the charge stand 40. Thus, the charge terminals 4 come in contact with the terminal portions 41, causing the battery 13 to be charged.

Upon a user designating a designated cleaning location by using the infrared remote controller 60, the cleaning robot 1 moves in a self-propelled manner to the designated location detected by the infrared sensor 18, where it executes a cleaning operation. It is also possible to set the cleaning robot 1 to execute a cleaning operation while traveling in a self-propelled manner when moving to the designated location.

Figure 6:
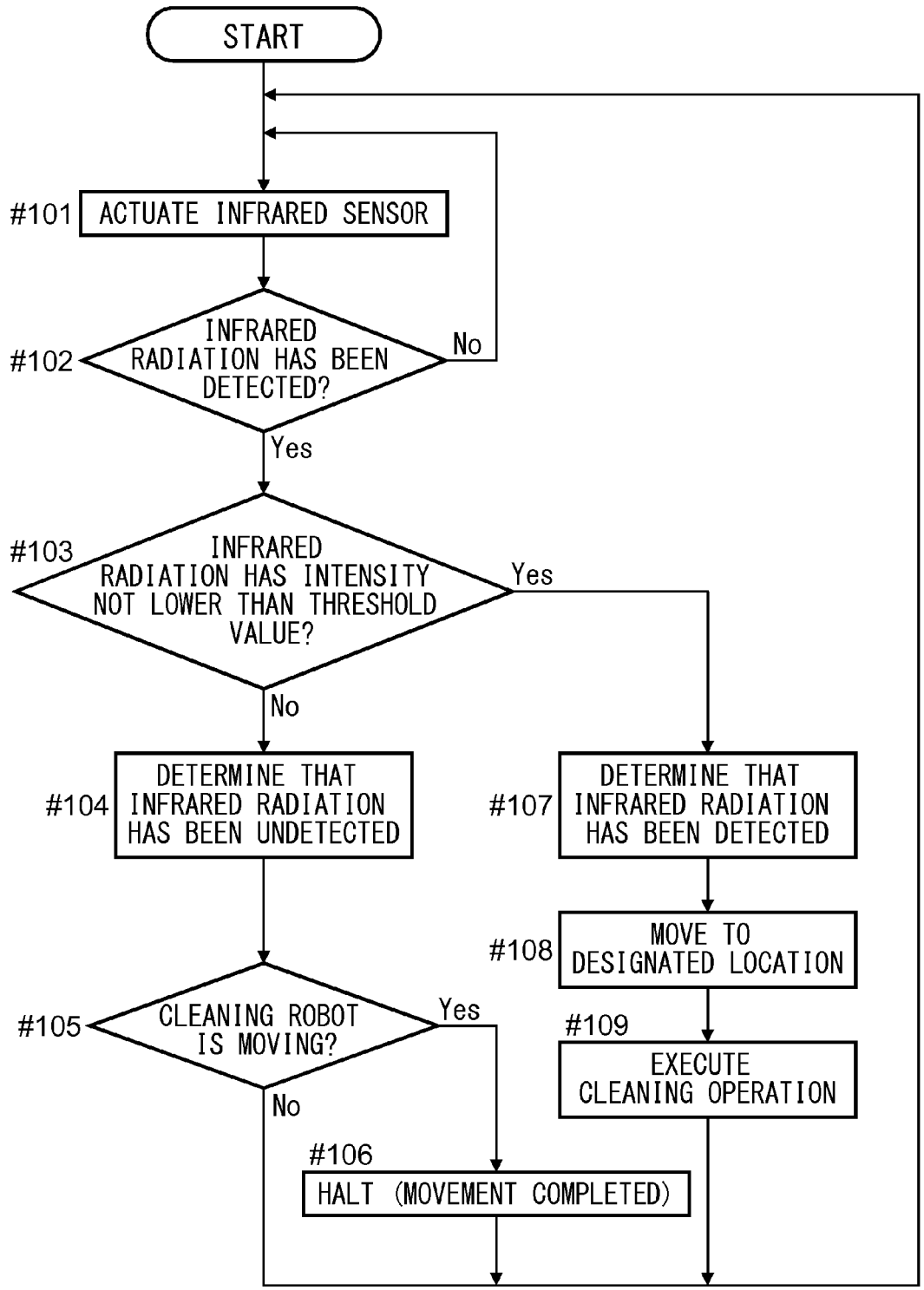
FIG. 6 is a flow chart showing an operation related to cleaning at a designated location by the cleaning robot in FIG. 1.

Next, with reference to a flow shown in FIG. 6, a description is given of an operation related to cleaning at a designated location by the cleaning robot 1. FIG. 6 is a flow chart showing the operation related to cleaning at a designated location by the cleaning robot 1.

Upon a start of an operation of the cleaning robot 1 (START in FIG. 6), the CPU 14a, while making the main body housing 2 travel to execute cleaning and ion delivery, actuates the infrared sensor 18 via the control unit 18a (Step #101 in FIG. 6). It is then judged whether or not the infrared sensor 18 has detected infrared radiation (Step #102). In a case where the infrared sensor 18 has not detected infrared radiation (No in Step #102), a return is made to Step #101, in which the detection of infrared radiation by the infrared sensor 18 is continuously performed.

In a case where the infrared sensor 18 has detected infrared radiation (Yes in Step #102), the CPU 14a judges whether or not the infrared radiation detected has an intensity not lower than a predetermined threshold value (Step #103). A threshold value of an intensity of infrared radiation is preset and stored in the storage portion 17 or the like.

In a case where the infrared sensor 18 has not detected infrared radiation having an intensity not lower than the predetermined threshold value (No in Step #103), the CPU 14a determines that infrared radiation emitted from the infrared remote controller 60 has not been detected (has been undetected) (Step #104).

It is then judged whether or not the cleaning robot 1 is moving (Step #105). In a case where the cleaning robot 1 is at a halt (No in Step #105), a return is made to Step #101, in which the detection of infrared radiation by the infrared sensor 18 is continuously performed. On the other hand, in a case where the cleaning robot 1 is moving (Yes in Step #105), the main body housing 2 is brought to a halt (movement completed) (Step #106), after which a return is made to Step #101, in which the detection of infrared radiation by the infrared sensor 18 is continuously performed.

In a case where, in Step #103, the infrared sensor 18 has detected infrared radiation having an intensity not lower than the predetermined threshold value (Yes in Step #103), the CPU 14a determines that infrared radiation emitted from the infrared remote controller 60 has been detected (Step #107).

The CPU 14a then controls the travel motor 51 via the motor driver 51a to make the main body housing 2 move in a self-propelled manner to a designated location (Step #108). Subsequently, the cleaning robot 1 executes a cleaning operation at the designated location (Step #109).

In the cleaning operation at the designated location, for example, the cleaning robot 1, while driving the motor-driven blower 22, makes both the drive wheels 5 rotate in a direction opposite to each other so that the main body housing 2 turns around in place about the center line C without moving. After this cleaning operation is executed for a preset given length of time, the cleaning operation is brought to a halt, and a return is made to Step #101, in which the detection of infrared radiation by the infrared sensor 18 is restarted.

It is also possible to set the cleaning robot 1 to execute a cleaning operation while traveling in a self-propelled manner when moving to a designated location. Furthermore, a length of time in which the cleaning robot 1 stays, for the execution of cleaning, at a designated location designated by using the infrared remote controller 60 is set to a preset given length of time as described above, and in another possible configuration, a length of time in which the cleaning robot 1 stays at a designated location is made to vary according to a length of designation time in which designation using infrared radiation is performed. Moreover, a configuration also may be adopted in which an ion delivery operation is independently executed in a time in which the cleaning robot 1 stays at a designated location.

Furthermore, as a designated location designated by using the infrared remote controller 60, one location is designated as described above, and in another possible configuration, as such designated locations, a plurality of locations are designated in sequence, and cleaning is executed on a route connecting the plurality of designated locations. Moreover, a configuration also may be adopted in which, as such designated locations, three or more locations are designated, and cleaning in a region surrounded by those designated locations is executed. Further, a configuration also may be adopted in which irradiation with infrared radiation used for designating a designated location by using the infrared remote controller 60 is continually performed with the infrared radiation being moved so that the cleaning robot 1 executes cleaning while following the infrared radiation.

As described above, the cleaning robot 1 includes the infrared remote controller 60 that designates, by emitting infrared radiation, an arbitrary location in a space in which the main body housing 2 is installed, and the infrared sensor 18 that detects the location thus designated by the infrared remote controller 60, and moves to the designated location detected by the infrared sensor 18, where it executes a cleaning operation. That is, upon a user designating a desired location by using the infrared remote controller 60, the infrared sensor 18 in the cleaning robot 1 detects the location thus designated, and the cleaning robot 1 automatically moves to the designated location, where it executes a cleaning operation, and/or executes a cleaning operation when moving to the designated location. Thus, it is possible to solve the problem that cleaning at a user's desired designated location requires effort and takes a lot of time, thus causing a feeling of discomfort to the user. Furthermore, it is possible to prevent power from being consumed more than necessary for the cleaning.

Furthermore, the cleaning robot 1 is configured so that a length of time in which it stays at a designated location is made to vary according to a length of designation time in which designation using infrared radiation is performed, and thus executes a cleaning operation at the designated location for a length of time varying according to the length of designation time. Thus, cleaning at a user's desired arbitrary location can be executed for a desired arbitrary length of time.

Furthermore, as a designation device for making the cleaning robot 1 move to a designated location, where it executes a cleaning operation, the infrared remote controller 60 that emits infrared radiation is used, and as a detection device that detects a designated location, the infrared sensor 18 that detects infrared radiation is used. Thus, it is possible to provide increased handling ease for a user in designating a desired arbitrary location as a designated cleaning location.

Furthermore, the cleaning robot 1 includes the ion generation device 25 that releases ions into airflow flowing through the air exhaust port 7 and is configured as follows. That is, the cleaning robot 1 moves to a designated location designated by a user by using the infrared remote controller 60, where it executes a cleaning operation, and delivers ions to inside a room at the designated location. Thus, it is possible not only to automatically execute a cleaning operation at a designated location designated by a user but also to automatically execute an ion delivery operation at the designated location.

Further, according to the configuration of the foregoing embodiment of the present invention, the cleaning robot 1 automatically moves to a designated location designated by a user by using the infrared remote controller 60, where it executes a cleaning operation. With this configuration, the cleaning robot 1 can be easily guided to a user's desired arbitrary location, and thus cleaning at a user's designated location can be executed with promptness and reduced power consumption. Thus, there can be provided the cleaning robot 1 that is capable of implementing a cleaning operation with further improved efficiency.

While the foregoing has described the embodiment of the present invention, the present invention is not limited in scope thereto and can be carried out in variously modified forms without departing from the spirit of the invention.

For example, while the foregoing embodiment uses the infrared remote controller 60 as a designation device, a designation device that can be used is not limited to a device that emits infrared radiation and may be a device that emits any other type of electromagnetic wave such as a radio wave, a visible light ray, or ultraviolet radiation, or a sound wave.

INDUSTRIAL APPLICABILITY

The present invention is applicable to a cleaning robot that travels in a self-propelled manner on a floor surface.

LIST OF REFERENCE SYMBOLS 1 cleaning robot
2 main body housing
5 drive wheel
6 suction port
7 air exhaust port
8 concave portion
9 rotary brush
10 side brush
11 first air suction path
12 second air suction path
13 battery
14 control board
14a CPU
17 storage portion
18 infrared sensor (detection device)
20 motor unit
21 housing
22 motor-driven blower
23 opening portion
24a first air exhaust path
24b second air exhaust path
25 ion generation device
30 dust collection portion
31 dust collection container
51 travel motor
60 infrared remote controller (designation device)

The invention claimed is:
1. A cleaning robot, comprising:
a main body housing that has a suction port and an air exhaust port formed therethrough and travels in a self-propelled manner on a floor surface;
a motor-driven blower that is arranged in the main body housing;
a dust collection portion configured to collect therein dust in airflow sucked in through the suction port by driving of the motor-driven blower;
a designation device that is provided separately from the main body housing and which designates, by emitting an electromagnetic wave or a sound wave, an arbitrary location in a space in which the main body housing is installed; and
a detection device that detects the location thus designated by the designation device, wherein
the cleaning robot moves to the designated location detected by the detection device, where it executes a cleaning operation, and/or executes a cleaning operation when moving to the designated location; and
a length of time in which the cleaning robot stays at the designated location is made to vary according to a length of a designation time in which designation using the electromagnetic wave or the sound wave is performed.

2. The cleaning robot according to claim 1, wherein the electromagnetic wave emitted by the designation device is infrared radiation, and as the detection device, an infrared sensor that detects infrared radiation is used.

3. The cleaning robot according to claim 1, further comprising
an ion generation device that releases ions into airflow flowing through the air exhaust port.

* * * * *